United States Patent Office 3,567,575
Patented Mar. 2, 1971

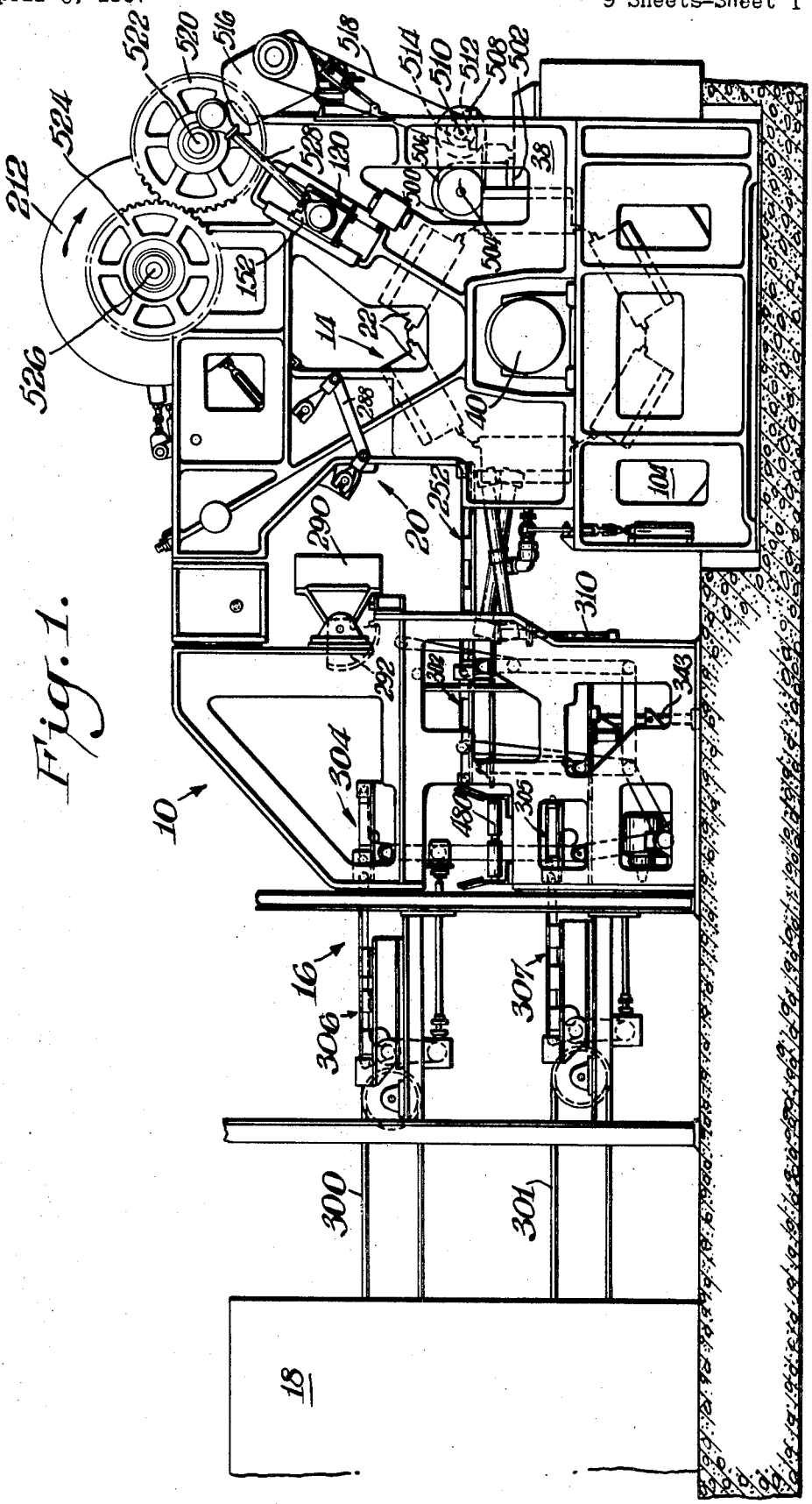

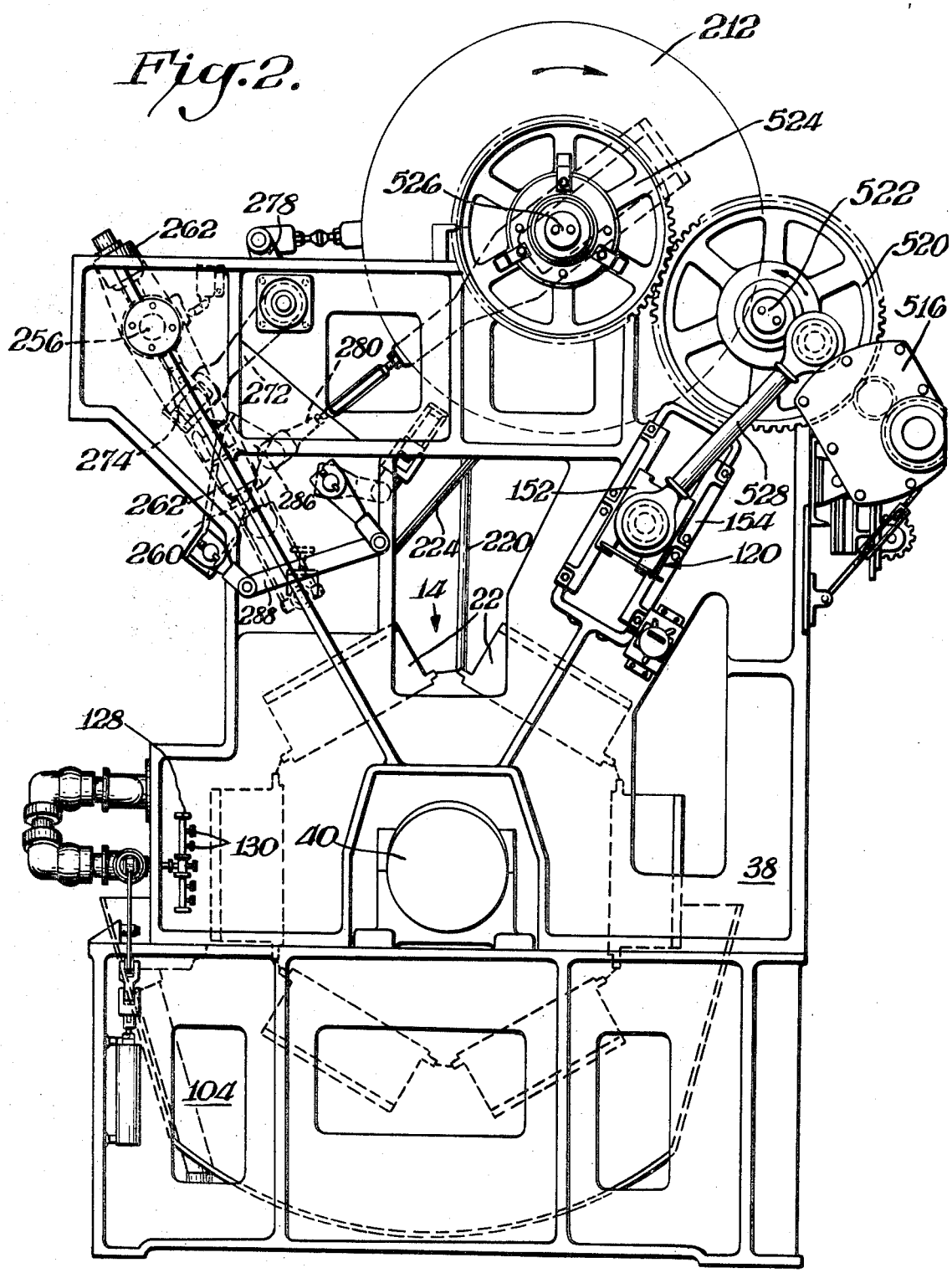

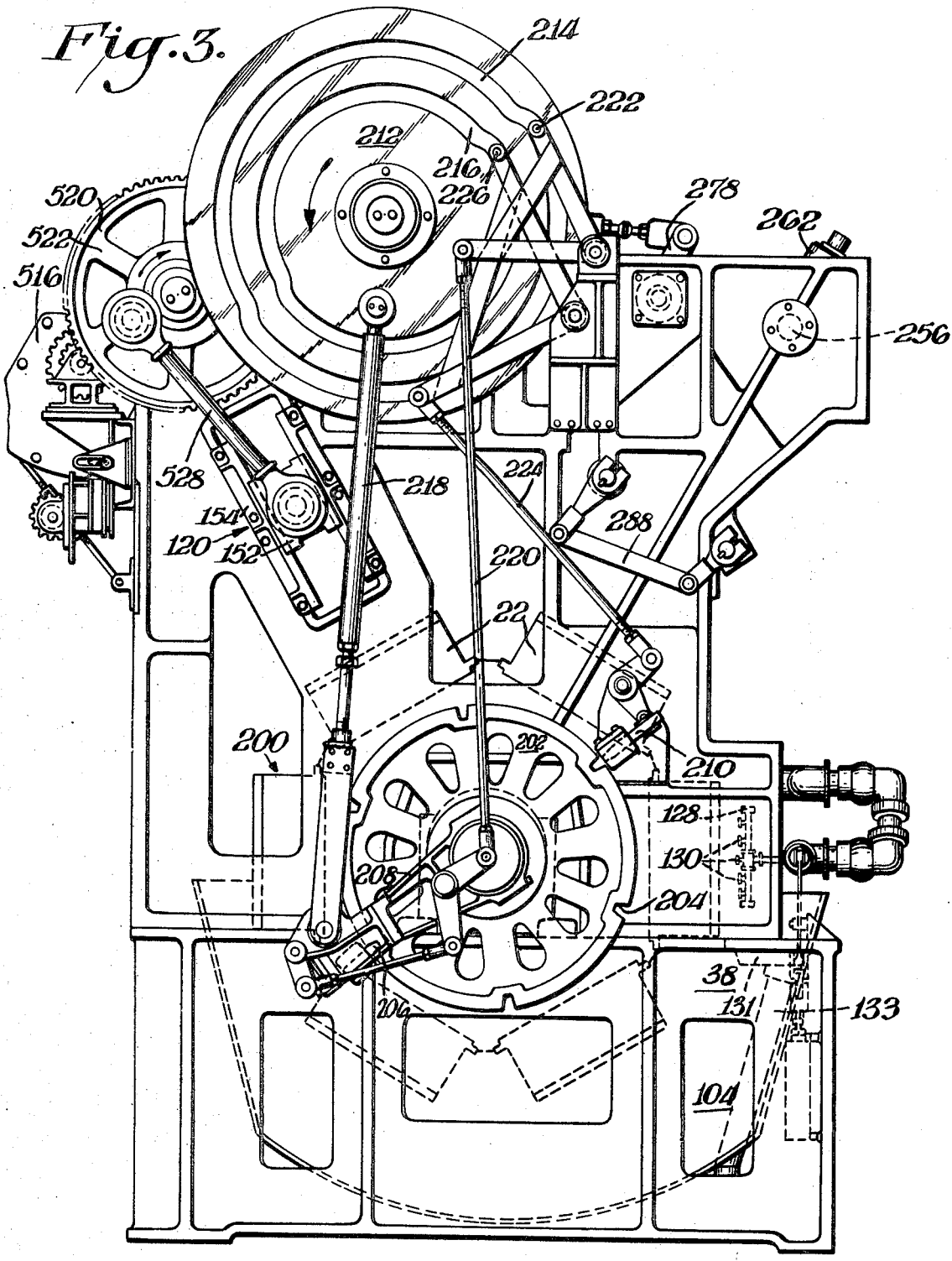

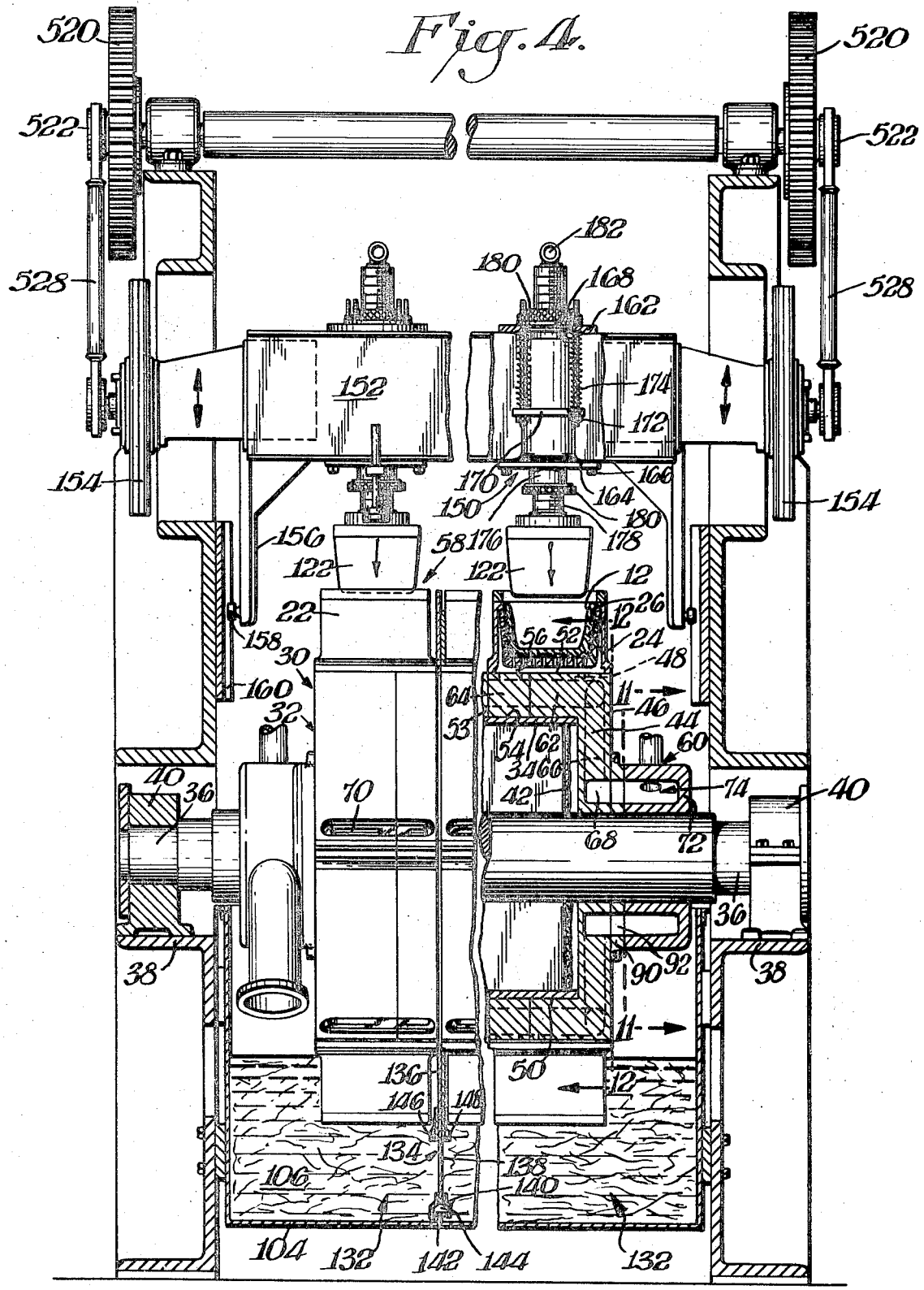

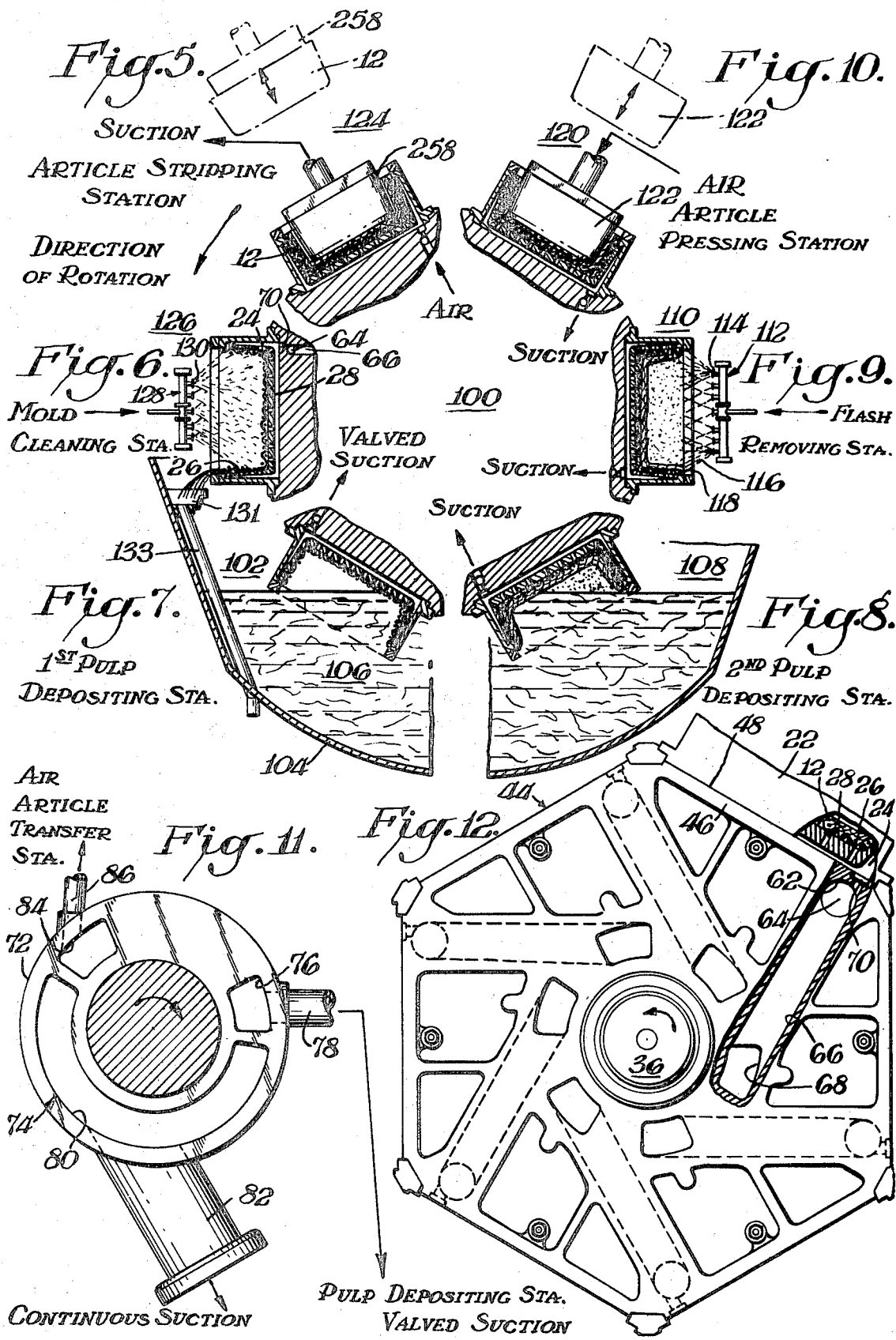

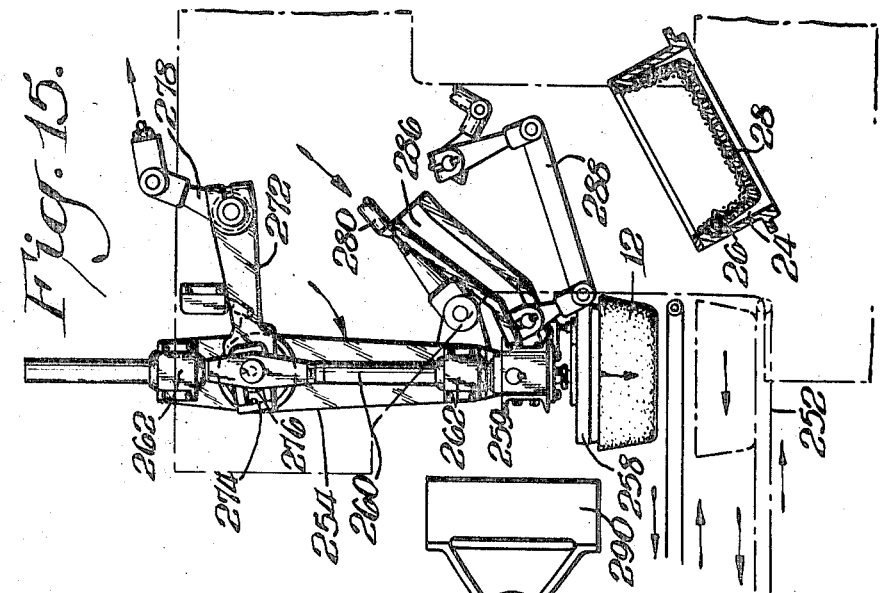
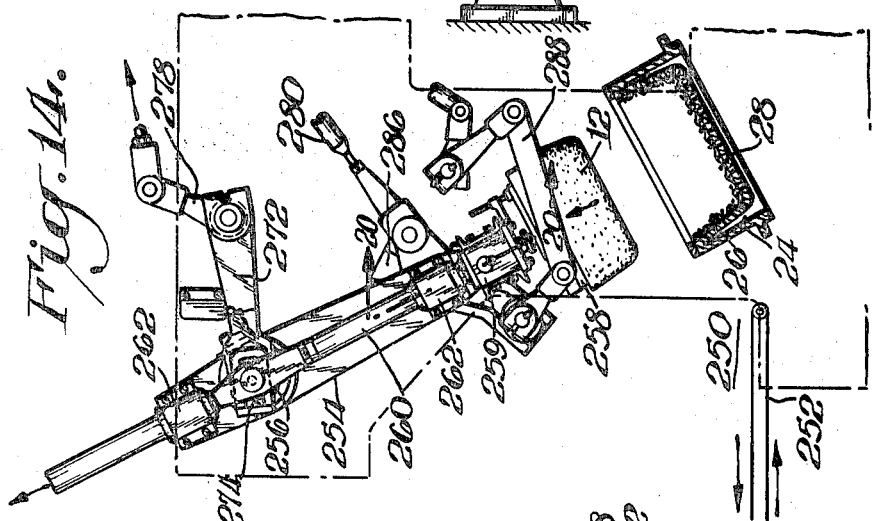
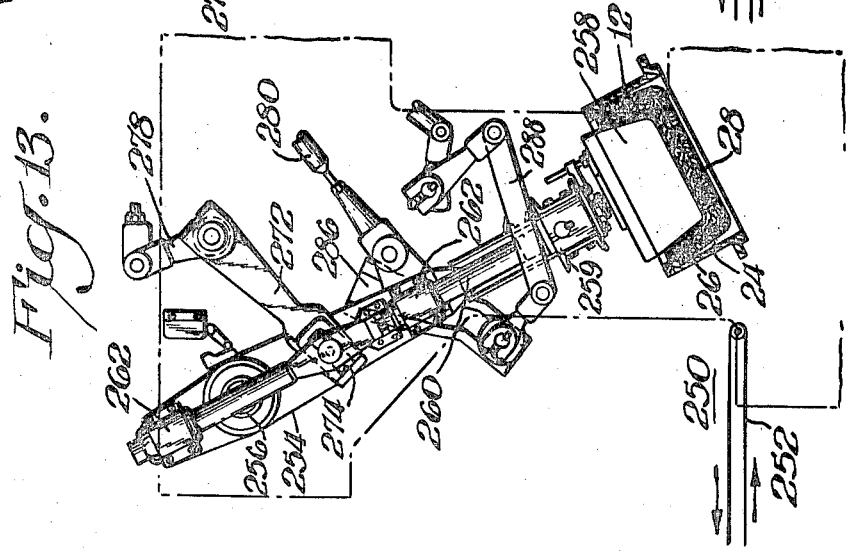

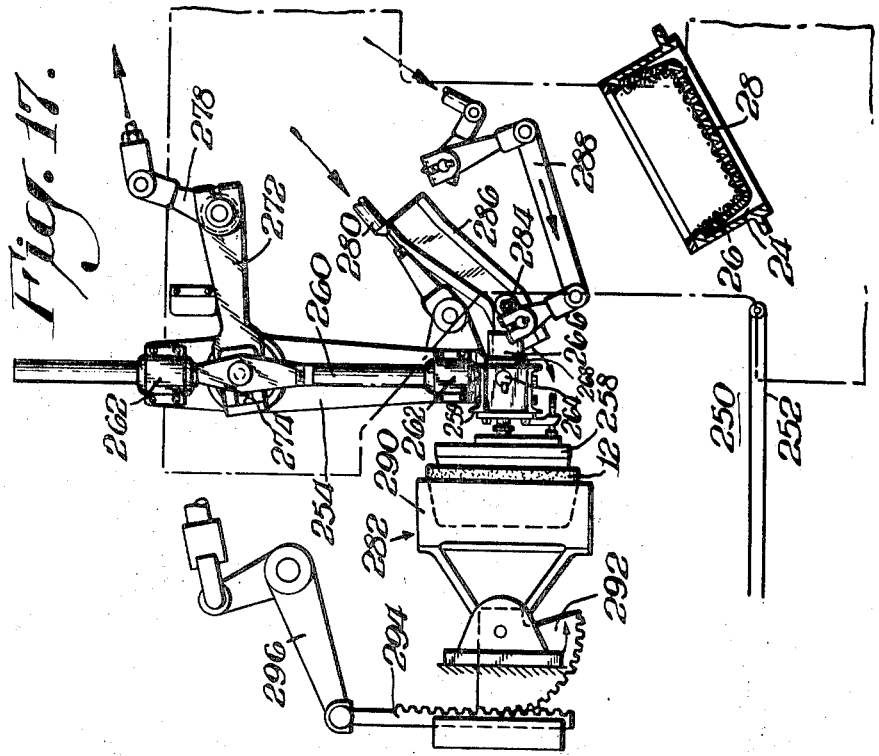
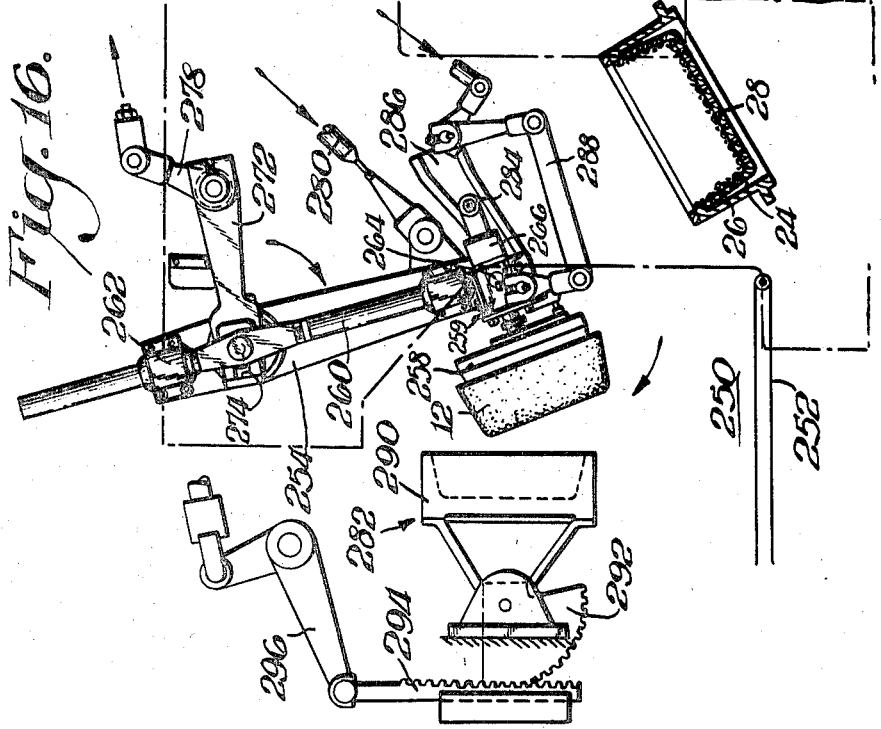

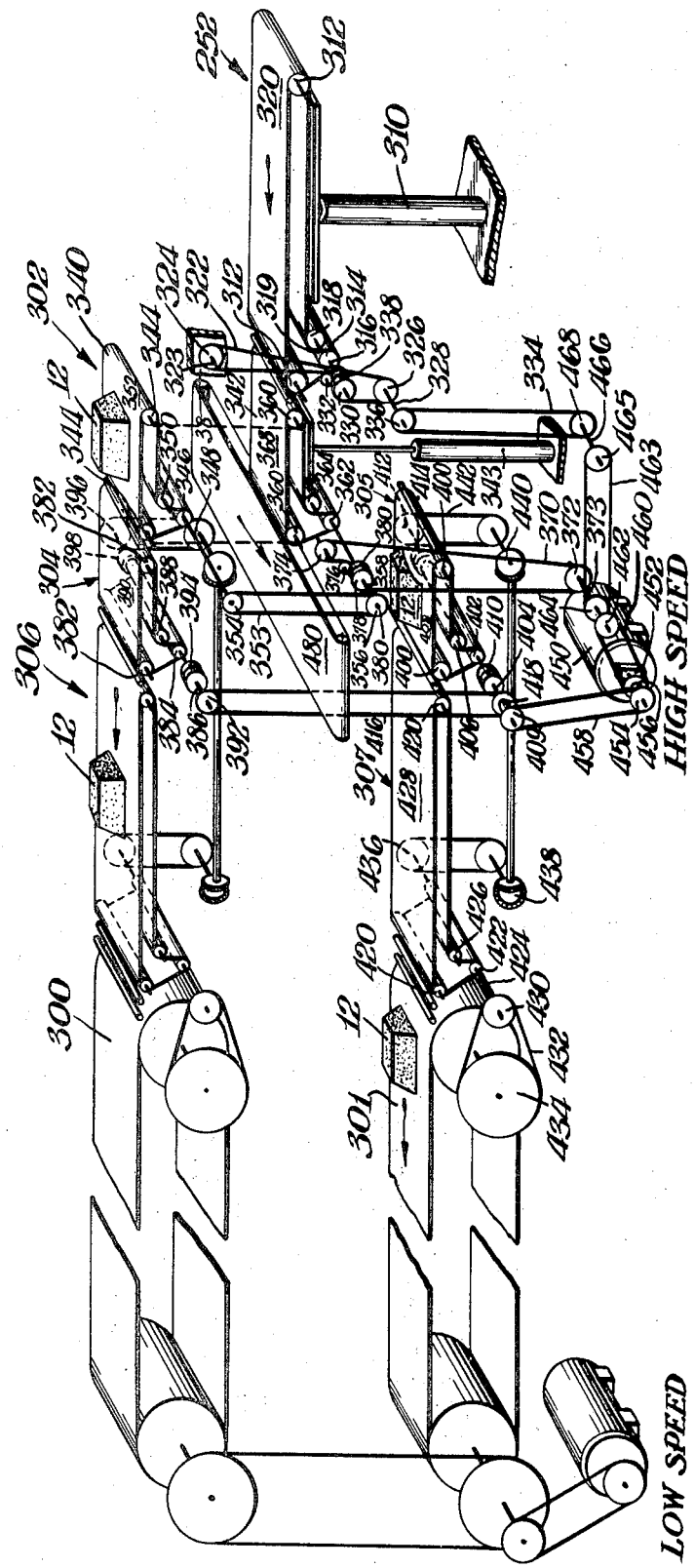

3,567,575
APPARATUS FOR PRODUCING FIBROUS PULP ARTICLES
Richard L. Emery, Fairfield, Maine, assignor to Keyes Fibre Company, Waterville, Maine
Filed Apr. 6, 1967, Ser. No. 628,916
Int. Cl. D21j *3/10*
U.S. Cl. 162—387
7 Claims

ABSTRACT OF THE DISCLOSURE

Apparatus for producing fibrous pulp articles comprising means for manufacturing the articles, means for conveying the articles to an article dryer, and means for transferring the articles from the manufacturing means to the conveying means, the article manufacturing means including a plurality of forming molds connected to a framework for rotation past spaced article processing stations, and indexing means connected to the framework for intermittently rotating the forming molds to the article processing stations.

BACKGROUND OF THE INVENTION

This invention relates to an apparatus for producing articles, and more particularly to a molding machine that continuously forms fibrous pulp articles, transfers the formed articles to a conveyor system, and conveys the articles to several levels of a dryer to produce finished molded pulp articles.

In the past, numerous arrangements have been proposed for continuously forming articles from fibrous pulp material, and for handling and transporting the "green" or still damp pulp articles. The heretofore available arrangements can not, however, manufacture, transfer and convey a maximum number of fibrous pulp articles in a minimum amount of time with the efficiency and flexibility of the present apparatus.

Modern packaging specifications require fibrous pulp articles having a vast variety of configurations. As is well known, due to the holding operation, fibrous pulp articles have both smooth and roughened surfaces, the smooth surface being that surface which is next to the forming mold. Whether the smooth surface is located exteriorly or interiorly of the article depends upon the type of mold employed to form the article. For example, a male mold as well as female mold can be utilized to manufacture a dish shaped container or other article. If a male mold is employed the interior of the formed container is smooth, while a female mold will produce a container having a rough interior. Although the selection of one type of mold over another may be a simple matter of choice in view of the article desired, the subsequent handling or transferring of the green formed article depends upon the particular molding equipment utilized to form the product. By way of example it may be desired to position the container on a conveyor with the bottom end down, to thereby lessen the possibility of container deformation. If a smooth interior surface is desired, a male mold must be used and such a molding technique requires that the article be inverted during its transfer from the mold to the conveying system. On the other hand, if a container having a smooth exterior is preferred a female mold can be employed and no inversion is necessary during the transfer step. No heretofore available high volume machine provides such transfer arrangements which are readily adapted to the structural particulars of the articles produced.

The pulp molding industry has also long sought an article manufacturing machine which is capable of simultaneously producing a variety of fibrous pulp products from a number of different pulp slurry compositions. Moreover, demands for similarly shaped articles differing only in pulp characteristics—such as color—have become so great they now present major problems to the package producing community. The wasted time involved in changing the pulp slurry bath renders the prior manufacturing machines extremely undesirable from an economic standpoint.

Accordingly, it is an object of the present invention to provide an apparatus for continuously producing fibrous pulp articles in high volume mass production with increased efficiency and heretofore unattainable versatility.

SUMMARY OF THE INVENTION

In accordance with the present invention, fibrous pulp articles are manufactured by rotating a plurality of article forming molds past spaced article processing stations. Pulp depositing stations are provided for depositing fibrous pulp material upon the forming molds and a flash removing station functions to remove the pulp flashing which accumulates near the peripheral portions of the formed article. A pressing station is also provided for pressing the fibrous pulp material within the forming mold and an article stripping station provides a location where the article can be removed from its associated forming mold. Finally, the mold is flushed with water at the cleaning station to remove wasted pulp which tends to adhere to the mold surface.

The plurality of forming molds may comprise a series of individual mold assemblies each of which is spaced from an adjacent assembly and arranged to rotate upon a common shaft past the spaced article processing stations. The mold assemblies travel through a common pulp slurry bath which may be divided into individual compartments to enable articles to be formed of different pulp slurry compositions. Partitions for the slurry bath are preferably made adjustable so that each mold assembly may pass through a different pulp slurry composition, if desired.

The fibrous pulp article is transferred from its associated forming mold to an article conveyor arrangement by a transfer mechanism having an article take-off head which enters the mold at the stripping station to withdraw the article. This transfer mechanism includes a transfer arm which carries the withdrawn article to a position directly over and in close proximity to an article pick-up conveyor. The article is ejected from the take-off head onto the conveyor which then drops to a lower elevation to enable the transfer arm to shift to a position over the next article to be transferred.

The article transfer mechanism of the present invention includes an inverter arrangement that functions to invert the removed article during its transfer from the mold to the pick-up conveyor. The inverter may be active or inactive and is provided to properly position the formed but still green fibrous pulp article upon the article pick-up conveyor. This arrangement is particularly useful for inverting most articles formed upon a male mold since these articles can then be positioned bottom end down on the pick-up conveyor to thereby lessen or substantially eliminate deformation of the green pulp article.

Once the articles are positioned upon the pick-up conveyor the remainder of the conveyor system comes into play to deliver them to the article dryer. The dryer includes several vertically spaced apart conveyors and each conveyor is supplied with only a fraction of the newly formed articles. With this arrangement the speed of the dryer conveyors can be at least one half the article production rate. This minimizes the length of the dryer as well as the operational speed of stacking equipment located at the exit end of each dryer conveyor since each conveyor handles only a fraction of the articles produced by the machine and can therefore move at a slower rate when compared to the production rate of the machine.

BRIEF DESCRIPTION OF THE DRAWING

Other objects and advantages of the present invention will become apparent to one skilled in the art from a reading of the following description in conjunction with the accompanying drawings wherein similar reference characters refer to similar parts, and in which:

FIG. 1 is a right side elevational view of an article producing apparatus according to the present invention;

FIG. 2 is a right side elevational view of the manufacturing and transfer arrangements of the apparatus of FIG. 1;

FIG. 3 is a left side elevational view of the manufacturing arrangement of the apparatus of FIG. 1;

FIG. 4 is a transverse sectional view of the apparatus of FIG. 1 with portions in section to show detail;

FIG. 5 is a fragmentary sectional view of the article stripping station;

FIG. 6 is a fragmentary sectional view of the mold cleaning station;

FIG. 7 is a fragmentary sectional view of the first pulp depositing station;

FIG. 8 is a fragmentary sectional view of the second pulp depositing station;

FIG. 9 is a fragmentary sectional view of the flash removing station;

FIG. 10 is a fragmentary sectional view of the article pressing station;

FIG. 11 is a sectional view on line 11—11 of FIG. 4;

FIG. 12 is a sectional view on line 12—12 of FIG. 4;

FIG. 13 is a fragmentary elevational view of the article transfer arrangement;

FIG. 14 is a fragmentary elevational view similar to FIG. 13 showing a different portion of the sequence of operation;

FIG. 15 is a fragmentary elevational view similar to FIG. 13 showing a different portion of the sequence of operation;

FIG. 16 is a fragmentary elevational view of the article transfer arrangement including the article inverter mechanism;

FIG. 17 is a fragmentary elevational view similar to FIG. 18 showing a different portion of the sequence of operation;

FIG. 19 is a fragmentary perspective view of the article conveyor system; and

DETAILED DESCRIPTION OF THE INVENTION

Figure 18:
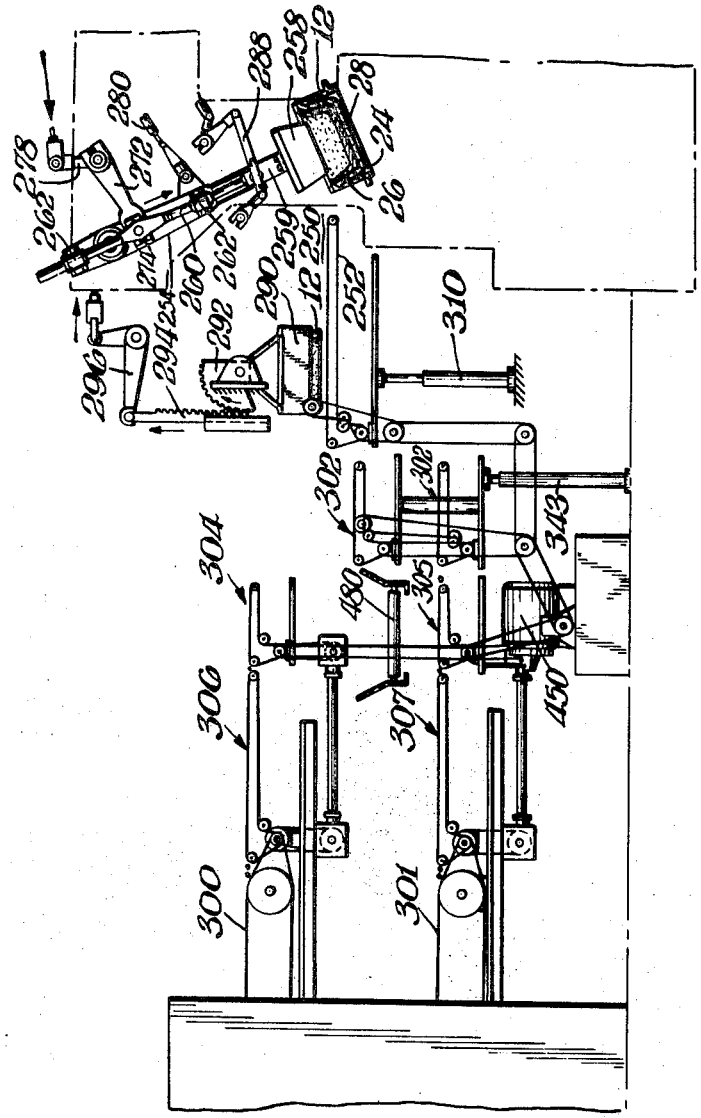
FIG. 18 is a fragmentary elevational view of the article transfer and conveyor arrangements.

Referring in more particularity to the drawings, an apparatus 10 is provided for continuously producing fibrous pulp articles 12. The apparatus generally comprises an article manufacturing arrangement 14 for continuously forming articles from fibrous pulp material, an article conveyor system 16 for transporting fibrous pulp articles to several levels of an article dryer 18, and an article transfer mechanism 20 for transferring fibrous pulp articles from the manufacturing arrangement 14 to the conveyor system 16.

The manufacturing arrangement 14 of the present invention includes a plurality of article forming molds 22 of the type commonly used to manufacture fibrous pulp articles. Each mold has a hollow interior 24 and wire screening 26 upon which fibrous pulp material is deposited to form the articles. Passageways 28 extend from the interior to the exterior of the mold so that suction applied to the passageways is directed onto the wire screening. As explained more fully below, as the forming molds travel through a pulp slurry bath suction is applied to draw pulp fibers onto the screening as the liquid phase of the bath passes through the mold.

As best illustrated in FIG. 4, the plurality of forming molds 22 are secured to a rotatable mold supporting structure 30 comprising a group of individual hexagonally shaped castings 32 mounted upon a cylindrical drum 34. The drum 34 is fixed to a transverse drive shaft 36 journaled to the main framework 38 of the apparatus 10 by a pair of bearings 40. Bracing structure 42 fastened between the drum and the transverse drive shaft can be provided to connect the drum and drive shaft together.

The hexagonally shaped castings 32 of the rotatable mold supporting structure 30 include a pair of end castings 44 each having an end plate portion 46 and a mold supporting portion 48. The mold supporting portion has a cylindrical interior 50 and a six sided exterior surface 52 upon which the forming molds may be mounted. The cylindrical interior 50 is preferably dimensioned slightly smaller than the outer diameter of the drum 34 so that the end castings may be force fitted onto the drum when the mold supporting structure is assembled. The hexagonally shaped castings 32 also include center castings 53 mounted upon the drum 34 between the end castings 44. Each center casting 53 has a cylindrical interior 54 force fitted onto the drum, and a six sided exterior mold supporting surface 56 upon which the forming molds are mounted.

The plurality of article forming molds are preferably divided into groups of individual mold assemblies 58, each assembly including six radially arranged forming molds, one mold secured to each side of the hexagonally shaped castings 32. The present mold supporting structure 30 is designed to accommodate six or more mold assemblies although, for purposes of clarity, only three of these assemblies are shown in FIG. 4.

Referring now to FIGS. 4 and 12, the hexagonally shaped castings 32 of the mold supporting structure 30 also include an internal porting arrangement 60 for receiving selected fluid mediums from the forming molds mounted thereon and for directing other fluids thereto. The center castings 53 and the mold supporting portions 48 of the end castings 44 have six radially arranged transverse passageways or ports 62 which together form six transverse branches 64, one branch running beneath each of the six mold supporting surfaces. As shown in FIG. 12, the end plate portion 46 of each end casting 44 includes outwardly directed branches 66, and each branch runs from a separate opening 68 in the end casting to one of the transverse branches 64. Thus, fluid, received from or supplied to, a selected mold is directed across a selected mold surface through a selected path of branch 64, branch 66 and port 68 through the porting arrangement 60 which comprises the above described system of transverse and outwardly extending branches.

Each mold supporting surface of the hexagonally shaped castings 32 also includes a series of slot-like apertures 70 which communicate with the transverse branches 64 to direct selected fluid mediums to or from the forming molds mounted over the apertures. The apertures 70 in each of the six mold supporting surfaces are closely spaced to one another to thereby allow the mold assemblies 58 to be mounted upon the mold supporting structure 30 at a variety of different locations.

The internal porting arrangement 60 of the present invention also includes a fixed port box 72 at each end of the rotatable mold supporting structure 30 for directing selected fluid mediums to or from the various transverse branches 64 of the porting arrangement. Each port box 72 has arcuate slot-like ports 74 which align with selected openings 68 in the end castings 44 as the mold supporting structure is caused to rotate relative to the fixed port boxes. One arcuate port 76 in each port box 72 may be connected by a line 78 to supply valved suction to selected forming molds as the various openings 68 in the end castings 44 rotate past that port. Another port 80, somewhat larger than the valved suction port 76, is connected by a line 82 to supply continuous suction to selected forming molds as the openings 68 in the end castings 44 communicate with that continuous suction port. The port 80 is arranged so that three of the openings 68 in each end casting 44 are aligned with the continuous suction port at any one time. The third arcuate port 84 in each port box 72 is connected by a line 86 to supply selected forming molds with valve-controlled compressed air as the openings 68 communicate with that port.

A wear plate 90 having passageways 92 corresponding to the openings 68 in the end castings 44 may be secured to the end plate portion 46 of each end casting 44 to prevent wearing away of the end castings as they rotate relative to the fixed port boxes. Each wear plate can be positioned between a port box and an end casting so that the passageways 92 are aligned with the openings 68 in the end castings of the mold supporting structure.

The article manufacturing arrangement 14 of the apparatus 10 also includes a plurality of radially arranged article processing stations 100 for manufacturing the fibrous pulp articles 12. The processing stations are diagrammatically illustrated in FIGS. 5–10 as operating upon the forming molds of a single mold assembly 58, it being understood that the remaining mold assemblies cooperate with the article processing stations in a similar manner.

The article processing stations 100 of the manufacturing arrangement 14 comprise a first pulp depositing station 102 including a tank or bath 104 of fibrous pulp slurry composition 106. Valved suction from the arcuate port 76 of each port box 72 is directed to the forming mold at the first pulp depositing station 102 through the branch of the porting arrangement 60 associated with that particular mold. The suction is valved so that the depositing operation does not commence until the forming mold is completely immersed in the pulp slurry composition 106. Suction is then applied to the forming mold to draw pulp fibers onto the wire screening 26 as the liquid phase of the slurry is pulled through the mold perforations 28. By valving the suction in this manner the initial deposit of fibrous pulp material on the wire screening 26 comprises a coherent mass of randomly disposed fibers as opposed to a mass of similarly oriented fibers which might otherwise occur if the suction is applied while the mold is entering the bath. An initial deposit of randomly associated fibers prevents peeling of the article which undoubtedly would occur if the fibers were similarly oriented.

A second pulp depositing station 108 is provided for depositing additional fibrous pulp material upon the wire screening of the forming mold. At this station the forming mold 22 is connected by the internal porting arrangement 60 to the continuous suction port 80 of each port box 72. As described above, the somewhat larger continuous suction port 80 communicates with three of the openings 68 in the end castings 44 and thereby supplies continuous suction to the forming molds at the second pulp depositing station and the next two stations. Accordingly, the continuous suction enables pulp fibers to be drawn onto the wire screening of the forming mold until the mold rides out of the pulp slurry composition.

The article processing stations 100 also include a flash removing station 110 having a spray head 112 and nozzles 114 for directing a very directional, fine, high velocity water stream 116 onto the peripheral portions of the fibrous pulp material deposited within the forming mold. The quantity of water used should be kept to a minimum and the directionality well controlled to avoid erosion of parts of the article other than the periphery and to prevent undue dilution of the pulp slurry 106. The stream 116 functions to beat down or wash away pulp fiber flash which accumulates at the mold ring line 118 adjacent the wire screening 26. As previously explained, the suction is continuously applied to the forming mold at the flash removing station so that the major portion of the spray utilized to remove the flashing is drawn into the mold through the mold perforations 28. For the most part, the loosened fibers are carried by this water and felted onto the body of the article.

An article pressing station 120 is provided for pressing fibrous pulp material within the forming mold. The presssing station includes a pressing head 122 which reciprocates between pressing and retracted positions. As described above, the suction is continuously applied to the forming mold at the pressing station. This suction continues to draw the liquid phase of the pulp slurry composition through the mold and into the internal porting arrangement as the liquid is expressed from the fibrous pulp material during the pressing operation. The continuous suction also operates to maintain the fibrous pulp material in engagement with the article forming mold.

Additionally, the article processing stations 100 include an article stripping station 124 where the pressed article is removed from its associated forming mold. As explained more fully below, the article transfer mechanism 20 cooperates with the forming mold at the stripping station to remove the article. At the article stripping station 124 the forming mold is connected to the air stream port 84 of each port box 72 by the internal porting arrangement 60. The blast of air delivered to the forming mold at this station operates to eject the fibrous pulp article onto the article transfer mechanism 20 to thereby enable that mechanism to remove the article.

Finally, a mold cleaning station 126 is provided for removing any fibrous pulp material that remains in the forming mold. The cleaning station 126 may include an oscillating or reciprocating spray head 128 having nozzles 130 which travel across the wire screening 26 of the forming mold at the station to loosen and remove any remaining fibrous pulp mateiral. The spray nozzles 130 generally deliver so much water in the cleaning operation that the pulp slurry 106 would be diluted excessively, if allowed to fall unimpeded into the slurry. For these reasons, a trough 131 and drain pipe 133 are provided below the molds at the cleaning station to catch the water utilized in the cleaning operation. The spent water spills into the trough and flows through the drain pipe to a point outside the slurry-containing tank 104.

As best illustrated in FIG. 4, the tank 104 of pulp slurry composition 106 at the first and second pulp depositing stations 102, 108 can be divided into a plurality of compartments 132 by adjustable partition structure 134 so that the mold assemblies 58 travel through predetermined compartments of the tank. The partition structure 134 includes a circular two-piece plate 136 fitted between predetermined castings 32 for rotation with the mold supporting structure 30. The circular plate 136 cooperates with a stationary extension 138 having a channel-shaped portion 140 which fits over a rim 142 fixed on the inside of the tank. A water tight seal between the channel-shaped portion 140 and the rim 142 can be provided by an inflatable tube 144 positioned between the elements, the tube being inflated after the extension is fitted on the rim. The connection between the circular plate 136 and the extension 138 can also be made water tight by providing the plate with a pair of spring biased Teflon or firm felt seals 146 urged toward one another by leaf spirngs 148. The Teflon seals 146 are simply positioned one on each side of the extension 138 and form a water tight seal as the plate 136 rotates relative to the stationary extension.

Adjustable partition structure such as 134 may be provided for each mold assembly 58 to divide the slurry containing tank 104 into a plurality of compartments 132, one compartment for each mold assembly. Such division of the pulp slurry tank enables the various compartments to be filled with different pulp slurry compositions which in turn enables the apparatus 10 to simultaneously produce molded pulp articles of varying pulp slurry compositions.

The article pressing station 120 of the present invention includes a series of pressing assemblies 150 that cooperate with the various mold assemblies 58 to press the fibrous pulp material within the forming molds. The assemblies 150 are slidably attached to a reciprocating cross bar 152 mounted between a pair of cross bar guiding structures 154 connected to the main framework 38 of the apparatus. The cross bar 152 includes extensions 156 for stabilizing the bar as it reciprocates within the guiding structure 154. A roller 158 at the free end of each extension cooperates with a longitudinal channel 160 in framework 38 to steady the bar as it reciprocates.

Each pressing assembly 150 includes a pair of mounting plates 162, 164 for securing the assembly to the cross bar 152. The mounting plates are positioned on opposite sides of the cross bar and bolt-like fasteners 166 are provided to draw the plates together upon the bar when the pressing assembly is properly aligned with the forming molds of a particular mold assembly. Each pressing assembly 150 also includes a pair of movable plates 168, 170 secured to each other in spaced relation by a group of bolt-like fasteners 172 surrounded by a plurality of compression springs 174. One movable plate is disposed one each side of the upper mounting plate 162 with the compression springs 174 between the lower movable plate 170 and the upper mounting plate 162. A supporting tube 176 welded to the upper movable plate 168 extends downwardly through the cross bar 152 to provide fastening structure for an externally threaded hollow shaft 178 attached to the article pressing head 122. The shaft 178 extends through the tube 176 and is fastened thereto by a pair of internally threaded locking collars 180 which prevent the shaft from moving relative to the tube. An air line 182 connected to the hollow shaft 178 may be provided to supply the pressing head 122 with air to prevent the fibrous pulp material from adhering to the head during the pressing operation.

Each pressing assembly 150 can be adjusted to vary the pressing stroke and the force of the pressing head against the fibrous pulp material in the forming molds. The pressing stroke of each assembly 150 is easily adjusted by raising or lowering the threaded shaft 178 to a desired position relative to the supporting tube and then locking the shaft on the tube by rotating the collars 180 toward one another until the upper collar engages the plate 168 and the lower collar rests against the tube. The force generated by the pressing head 122 against the fibrous pulp material within the forming mold can be adjusted by varying the tension of the compression springs 174. Upwardly extending forces on the pressing head 174 cause it to move in an upward direction relative to the cross bar 152. As the pressing head moves upwardly the tube 176 attached to upper movable plate 168 also moves upwardly relative to the cross bar causing the upper plate 168 to draw the lower plate 170 in an upwardly direction to thereby compress the springs 174 between the fixed upper mounting plate 162 and the moving plate 170.

As illustrated in FIG. 3, the apparatus 10 includes an indexing mechanism 200 for rotating the forming molds to the spaced article processing stations 100 of the article manufacturing arrangement 12. The indexing mechanism comprises an indexing wheel 202 connected to the transverse drive shaft 36 upon which the mold supporting structure 30 is secured. The indexing wheel 202 has a plurality of equally spaced peripheral notches 204 which cooperate with a cam actuated slidable locking bolt 206 attached to a rotatable indexing arm 208 pivotally secured to the transverse drive shaft 36. The peripheral notches 204 on the indexing wheel 202 also cooperate with a second cam actuated slidable locking bolt 210 fixed to the main framework 38 of the apparatus.

A rotating cam wheel 212 having cam tracks 214, 216 is provided for sliding the locking bolts into and out of selected notches in the indexing wheel. The rotating cam wheel 212 is also connected to the indexing arm 208 by an adjustable rod 218 pivoted at its ends to the cam wheel and the indexing arm. The locking bolt 206 on the indexing arm 208 can be connected to the cam track 214 by a linkage arrangement 220 which extends from a cam follower 222 in the track 214 to the outer end of the bolt. Another linkage 224 and follower 226 are also provided to connect the second bolt 210 to the cam track 216.

With the rotating cam wheel 212 positioned as illustrated in FIG. 3, the locking bolt 206 attached to the rotatable indexing arm 208 rests within one of the notches 204 in the indexing wheel 202 to thereby secure the indexing arm to the wheel. At this position, the second locking bolt 210 is located at the outer extent of its sliding motion which unlocks the indexing wheel from the framework 38 to enable it to rotate with the indexing arm. As the cam wheel continues to rotate in the direction indicated, the connecting rod 218 commences to move in an upward direction carrying with it the indexing arm and the attached indexing wheel. The indexing wheel being secured to the transverse drive shaft 36 of the mold supporting structure 30 causes the structure to rotate until the rod 218 reaches the upward extent of its vertical travel. The upper limit of rod travel occurs after 180° of rotation of the cam wheel 212 from the position illustrated in FIG. 3. At this stage of the cycle, the cam followers 222 and 226 ride off the raised camming surfaces of the cam tracks 214, 216 which causes the locking bolts to simultaneously reverse their positions. Thus, the fixed locking bolt 210 shifts inwardly into one of the notches in the indexing wheel as the other locking bolt is withdrawn from its associated indexing notch. Continued rotation of the cam wheel then drives the rod 218 in a downward direction to return the indexing arm to the position shown in FIG. 3. Since the indexing wheel is locked to the main framework 38 by the locking bolt 210, the mold supporting structure 30 remains stationary during the return stroke of the rod. As readily understood, a single revolution of the cam wheel 212 will accordingly move each of the forming molds to the next article processing station.

As briefly described above, the article transfer mechanism 20 of the present invention operates to transfer articles from the stripping station 124 of the manufacturing arrangement 14 to an article receiving station 250 comprising a pick-up conveyor 252. The article transfer mechanism includes an inverter arrangement for inverting articles during the transfer operation and properly positioning them upon the article pick-up conveyor. By positioning the articles at the article receiving station in a predetermined manner loss due to deformation of the formed but still damp or undried articles is substantially eliminated. For example, as explained above, an article formed upon a male mold can be positioned upon the pick-up conveyor bottom end down by inverting the article during the transfer step. This prevents deformation of the bottom due to sagging which might otherwise occur if the articles were placed bottom end up upon the conveyor. Accordingly, once the particular forming mold is selected, the article inverter arrangement can be activated or deactivated depending upon how the article is to be ultimately positioned upon the pick-up conveyor.

Figure 20:
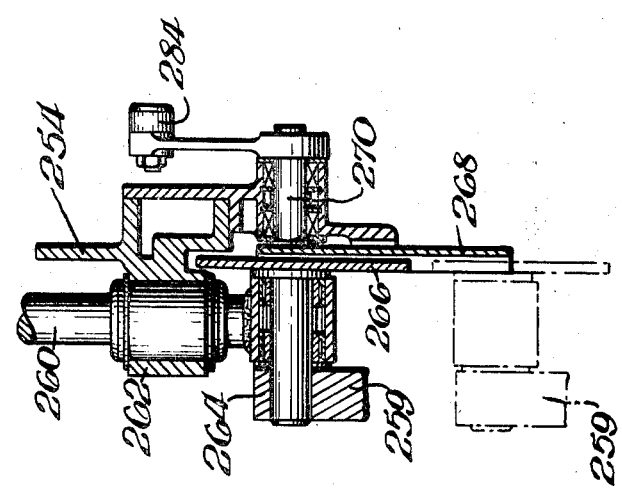
FIG. 20 is a sectional view on line 20—20 of FIG. 14.

Referring now to FIGS. 13 and 20, the article transfer mechanism 20 includes a pendulum or transfer arm 254 at each side of the apparatus pivotally connected to the main framework 38 by a pin 256. Each pendulum is connected to swing about the pin 256 between a position normal to the forming molds at the article stripping station 124, and a position directly above the pick-up conveyor 252. An article take-off head 258 for each mold assembly 58 of the manufacturing arrangement 14 is provided at the end of the pendulums for removing the articles at the stripping station from their associated forming molds.

Each take-off head 258 is adjustably mounted upon a cross bar 259 connected to each pendulum 254 by a rod 260 mounted for sliding motion within a pair of spaced bushings 262 anchored to the pendulum. Longitudinal movement of each rod 260 relative to the pendulums 254 causes the cross bar to shift each article take-off head between an extended position in which the head rests within the forming mold and the retracted position in which the head clears the mold.

As illustrated in FIG. 20, the cross bar 259 can be secured to a stub shaft 264 journaled to the lower end of each sliding rod 260. A block 266 secured to the shaft is provided for preventing the shaft from rotating when the take-off head is extended. The block 266 slides in a U-shaped support structure 268 fastened to a second stub shaft 270 as the cross bar shifts between its extended and retracted positions. The stub shafts 264, 270 are arranged to align with one another when the article take-off heads are in the retracted positions. As best illustrated in FIG. 20, the geometry of the stub shaft 264 and sliding block 266, in relation to the second stub shaft 270 and U-shaped support structure 268 prevents each shaft from rotating at all positions of the cross bar 259 except the retracted position.

The article transfer mechanism 20 also includes a suction applying device and suitable suction lines (not shown) for directing suction to the article take-off heads 258 which may be perforated so that suction is applied to the fibrous pulp material within the forming mold. Preferably, each article take-off head has an exterior surface which is spaced from the molded pulp article within the forming mold when the head is extended to remove the article. The particular construction of the take-off head thus enables the fibrous pulp article to be drawn onto the head in a lateral direction away from the mold when the suction is activated. By providing a take-off head somewhat smaller than the interior of the fibrous pulp article to be removed, the inclination or draft of the mold side walls usually required to facilitate article removal may be lessened or substantially eliminated.

The cross bar 259 is caused to reciprocate between the extended and retracted positions by a pair of actuating arms 272 pivoted to the main framework at each side of the apparatus. Each arm has a rectangular shaped opening or slot 274 at its free end which cooperates with a roller 276 secured to each sliding rod 260. As the arms 272 rotate upwardly, they carry the sliding rods in an upward direction relative to the pendulums 254 to thereby move the cross bar and article take-off heads to their retracted positions. Likewise, downward rotation of the actuating ams 272 causes each article take-off head to move to its fully extended position.

The article transfer mechanism 20 also includes a recipocating linkage 278 connected to each actuating arm 272 for raising and lowering the cross bar 259. Each linkage includes a cam follower (not shown) which rides in the cam track of a rotating cam plate (not shown) to produce the reciprocating motion. A linkage 280 is also provided for swinging each pendulum 254. Each linkage 280 incudes a cam follower (not shown) which rides in the cam track of a rotating cam plate (not shown) to generate the desired swinging motion of the pendulums.

As previously explained, the article transfer mechanism 20 of the present invention includes an article inverter arrangement 282 which may be activated to invert the articles during the transfer operation. The inverter arrangement includes a pair of cam followers 284 one connected to each stub shaft 264 and each follower rests within a rotatable bar cam 286 pivoted to the main framework of the apparatus. Each bar cam 286 is connected to a reciprocating linkage 288 which in turn is secured to a cam follower (not shown) that rides in a rotating cam plate (not shown). As the cam plates rotate, the linkages 288 reciprocate thereby causing each bar cam to rotate.

The article inverter arrangement 282 of the transfer mechanism 20 also includes an article receiving surface 290, one for each take-off head 258, pivoted to the main framework of the apparatus. A pinion 292 at each side of the apparatus is connected to a cross bar that carries the article receiving surfaces 290. A rack 294 slidably mounted to the framework at each side of the machine cooperates with the pinion 292 to rotate each article receiving surface between a position in line with an associated article take-off head 258, and a position directly above the article pick-up conveyor 252. Each rack 294 is connected to a reciprocating linkage 296 which includes a cam follower (not shown) that rides in the cam track of a rotating cam plate (not shown) to raise and lower the racks.

The article take-off heads 258 are simply positioned upon the cross bar 259 so they align with the forming molds of the various mold assemblies 58. Each take-off head is mounted upon the cross bar 259 in the same manner as the individual pressing assemblies 150 are secured to the pressing cross bar 152 so that the stroke of each head can be adjusted. Additionally, each take-off head includes a variable biasing arrangement (not shown) similar to the construction of each pressing assembly for varying the force of the head against the article within the forming mold when the head is extended to remove the article. Likewise, the article receiving surfaces 290 of the inverter mechanism are also positioned upon a cross bar so they align with the take-off heads 258.

The article conveyor system 16 of the present invention operates to transport fibrous pulp articles to a pair of vertically spaced apart dryer conveyors 300, 301 of the article dryer 18. The system includes the article pick-up conveyor 252 which receives articles from the transfer mechanism 20 and transports them to the remaining conveyors of the system. An article elevator conveyor arrangement 302 is provided for receiving articles from the pick-up conveyor 252 and for delivering them to positions in line with each dryer conveyor 300, 301. The conveyor system 16 also includes a pair of two-speed article conveyors 304, 305 one in line with each dryer conveyor 300 for transferring articles from the rapidly moving elevator conveyor arrangement 302 to a pair of slowly moving dryer extension conveyors 306, 307.

The article pick-up conveyor 252 includes a hydraulically operated elevating device 310 for raising the pick-up conveyor to an article receiving position and for lowering the conveyor to an article conveying position. In the upper position, the pick-up conveyor 252 is in close proximity to the article take-off head 258 and the article receiving surface 290 of the transfer arrangement 20. Such positioning enables fibrous pulp articles to be ejected onto the pick-up conveyor 252 with a minimum of difficulty and eliminates deformation of the article.

The article pick-up conveyor 252 includes a pair of horizontally spaced apart rollers 312, a driving roller 314 fixed to a transverse drive shaft 316, and an idler roller 318, connected to a transverse shaft 319. A belt 320 is trained about the rollers of the pick-up conveyor as illustrated in FIG. 19 and power is transmitted to the belt by a continuously moving vertically disposed roller chain 322 trained about a pair of rotary sprockets 324 and 326 each secured, respectively, to transverse shafts 323 and 328 journaled to the framework of the apparatus. The continuously moving roller chain 322 is also trained about a second sprocket 330 on the drive shaft 316 and an idler sprocket 332 fixed to the frame of the conveyor.

As illustrated in FIG. 19 the second sprocket 330 on the shaft 316 and the idler sprocket 332 move in a vertical direction along the roller chain 322 as the pick-up conveyor 252 reciprocates between its elevated article receiving position and the lower article conveying position. Movement of the pick-up conveyor 252 to the lower article conveying position allows the take off heads of the transfer mechanism to swing back to the positions above the next article to be transferred. Likewise, the lower position of the pick-up conveyor enables the article receiving surfaces of the inverter arrangement to swing back to the article receiving positions.

Power is continuously transmitted to the lower transverse shaft 328 by a continuosly moving roller chain 334 trained about a sprocket 336 fixed on shaft 328 for continuously driving the vertically disposed roller chain 322. An electrical clutch 338 on the transverse drive shaft 316 is provided for connecting the second sprocket 330 to the shaft when the pick-up conveyor 252 is lowered to the article conveying position and for disengaging the sprocket when the pick-up conveyor is elevated. Thus, when the article pick-up conveyor is lowered the electric clutch 338 is automatically actuated which connects the continuously rotating second sprocket 330 to the drive shaft 316. Rotation of the drive shaft 316 rotates the driving roller 314 which drives the belt 320 of the conveyor. The conveyor continues to run until the article is transported to the elevator conveyor arrangement 302 and then the electric clutch 338 is automatically deactuated.

The article elevator conveyor arrangement 302 of the conveyor system 16 includes two vertically spaced apart conveyors 340 and 342 which deliver articles from the pick-up conveyor 252 to the two-speed article conveyors 304, 305. A hydraulically operated elevating device 343 is provided for reciprocating the upper conveyor 340 between an article receiving position in line with the conveying position of the article pick-up conveyor and an article delivering position in line with the upper two-speed conveyor 304. The elevating device 343 simultaneously reciprocates the lower conveyor 342 of the arrangement between a receiving position in line with conveying position of the article pick-up conveyor 252 and a delivering position in line with the lower two-speed conveyor 305.

The conveyor 340 comprises a pair of spaced rollers 344, a driving roller 346 fixed to a transverse drive shaft 348 and an idler roller 350. A belt 352 is trained about the rollers as shown in FIG. 19 and power is intermittently transmitted to the drive shaft 348 by a roller chain 353 trained about a sprocket 354 fixed to the drive shaft 348. The roller chain 353 is also trained about a second sprocket 356 connected to a drive shaft 358 for the lower conveyor 342.

The lower conveyor 342 of the elevator conveyor arrangement also includes a pair of spaced rollers 360, a driving roller 362 fixed to the transverse drive shaft 358 and an idler roller 364. A belt 368 is trained about the rollers as illustrated in FIG. 19 and power is intermittently transmitted to the drive shaft 358 by a vertically disposed continuously moving roller chain 370 connected to a sprocket 372 on the shaft 373. The roller chain 370 is trained about the sprocket 372 and runs upwardly therefrom to a rotary sprocket 374. From the sprocket 374 the roller chain 370 runs in a downward direction and is trained about an idler sprocket 376 fixed to the frame of the lower conveyor. The roller chain 370 then runs to a sprocket 378 on the drive shaft 358 and from that sprocket the chain runs back to the continuously rotating sprocket 372 on the shaft 373.

The article elevator conveyor arrangement 302 includes an automatically actuated electric clutch 380 on the transverse drive shaft 358 for intermittently connecting sprocket 378 to the drive shaft. When the electric clutch is automatically actuated, power from the continuously rotating roller chain 370 is transmitted to the drive shaft 358 through the sprocket 378. Rotation of the drive shaft 358 causes the roller 362 to rotate which in turn drives the belt 368 of the lower convyor 342. The drive shaft 358 also transmits rotary motion to the drive shaft 348 of the upper conveyor through the sprockets 354, 356 and the roller chain 353 to drive the belt 352 of the upper conveyor.

The electric clutch 380 is automatically actuated as described below to cause the upper and lower conveyors of the arrangement 302 to rotate when either one is positioned in line with the conveying position of the article pick-up conveyor 252. Automatic control of the electric clutch 380 thus enables an article on the lower conveyor 342 to be transported to the lower two-speed conveyor 305 while the upper conveyor 340 is supplied with an article from the pick-up conveyor 252. Likewise, after the article elevator conveyor arrangement is elevated by the hydraulically operated elevating device 343, the article on the upper conveyor 340 is transported to the upper two-speed conveyor 304 while the lower conveyor 342 is supplied with an article from the pick-up conveyor.

As briefly described above, the article conveyor system also includes a pair of two-speed article conveyors 304, 305 for transporting articles from the elevator conveyor arrangement 302 to a pair of dryer extension conveyors 306, 307. The upper two-speed conveyor 304 comprises a pair of horizontally spaced rollers 382, a driving roller 384 fixed to a transverse drive shaft 386 and an idler roller 388. A belt 390 trained about the rollers functions to operate the conveyor 304 when the transverse drive shaft rotates. High speed rotary motion is transmitted to the drive shaft 386 by a first sprocket 392 which can be drivingly connected to the shaft by an automatically actuated electric clutch 394. The drive shaft 386 can also rotate at a low speed by transmitting low speed rotary motion to a second sprocket 396 which may be secured to the shaft by an electric clutch 398.

The lower two-speed article conveyor 305 also comprises a pair of horizontally spaced rollers 400, a driving roller 402 secured to a transverse drive shaft 404 and an idler roller 406. A belt 408, similar to the belt 390 of the upper conveyor, is trained about the rollers and functions to run the conveyor when the drive shaft rotates. Like the upper conveyor, high speed rotary motion can be transmitted to the drive shaft 404 by a continuously rotating first sprocket 409 which can be secured to the shaft by an automatically actuated electric clutch 410. The transverse drive shaft 404 also has a second sprocket 412 which can be drivingly connected to the shaft by an electric clutch 414 for running the conveyor at a lower speed. High speed rotary power is transmitted from the lower drive shaft 404 to the upper shaft 386 by a roller chain 416 trained about the first sprocket 392 on the upper shaft and a power take-off sprocket 418 fixed to rotate with the first sprocket 409 on the lower shaft 404.

Each dryer extension conveyor 306, 307 of the system 16 includes a pair of horizontally spaced rollers 420, a driving roller 422 fixed to a transverse drive shaft 424, and an idler roller 426. A belt 428 trained about the rollers of each dryer extension conveyor operates the conveyor as the transverse drive shafts rotate. Each shaft has a first sprocket 430 which is connected for rotation with one of the wire conveyors of the dryer 18 by a roller chain 432 trained about the sprocket 430 and a sprocket 434 on the transverse shaft for each dryer conveyor. Thus, continuous operation of the dryer conveyors 300, 301 also causes the dryer extension conveyors 306, 307 to run continuously.

The transverse drive shaft for each dryer extension conveyor also has a power take-off sprocket 436 for transmitting rotary motion to a first miter gear box 438 positioned below each shaft. Rotary power from each first gear box 438 is in turn transmitted to a second miter gear box 440 located beneath each of the second sprockets 396, 412 on the transverse drive shafts of the upper and lower two-speed conveyors 304, 305. From each second gear box 440 rotary power is then transmitted to each of the second sprockets 396, 412 by a roller chain 442 trained about a sprocket fixed to each second gear box and the second sprocket on the drive shaft of each two-speed conveyor.

The article conveyor system 16 includes an electric motor 450 connected to run the article pick-up conveyor 252, the article conveyors of the elevator arrangement 302 and each of the two-speed conveyors 304, 305. The motor 450 is connected to drive a gear reduction unit 452 having a pair of rotary sprockets 454, 456. One sprocket 454 is connected to the sprocket 409 on the drive shaft for the lower two-speed conveyor 305 by a roller chain 458 trained about each of the sprockets. The other sprocket 456 is connected to rotate the transverse shaft 373 of the article elevator arrangement 302 by a roller chain 460 trained about the rotary sprocket 456 and a second sprocket 462 fixed to the shaft 373. Rotary motion of the transverse shaft 373 is transmitted to the transverse shaft 328 of the article pick-up conveyor arrangement by a roller chain 463 trained about a third sprocket 464 on the shaft 373 and a sprocket 465 on a transverse shaft 466 journaled to the framework of the apparatus. The shaft 466 has a second sprocket 468 connected to the sprocket 336 on the shaft 328 by the roller chain 334.

Operation of the electric motor 450 continuously drives the vertically disposed roller chain 322 for the pick-up conveyor 252 which in turn rotates the sprocket 330 on the drive shaft 316. Automatic actuation of the electric clutch 338 connects the sprocket 330 to the transverse drive shaft 316 which in turn drives the belt 320 of the pick-up conveyor. Deactuation of the clutch 338 disconnects the sprocket from the drive shaft 416 and prevents the pick-up conveyor from running.

The electric motor 450 also functions to continuously drive the vertically disposed roller chain 370 of the article elevator conveyor arrangement 302 which rotates the sprocket 378 on the lower drive shaft 358. Activation of the electric clutch 380 connects the sprocket 378 to the drive shaft 358 which in turn drives the belt 368 of the lower conveyor 342. Power is transmitted from the lower shaft 358 to the upper drive shaft 348 for the conveyor 340 by the roller chain 353 and the sprockets 354, 356.

Finally, the electric motor 450 is connected to drive each of the two-speed article conveyors 304, 305 at a speed equal to the speed of the elevator conveyors 340, 342 and the pick-up conveyor 252. The two-speed conveyors are arranged so that one of the conveyors is running at the speed of the elevator conveyors while the remaining conveyor is operating at the speed of the dryer extension conveyors 306, 307. When the upper conveyor 340 of the article elevator arrangement 302 is in line with the conveying position of the article pick-up conveyor 252, automatic actuation of the electric clutch 410 connects the continuously rotating sprocket 409 to the drive shaft 404 of the lower two-speed conveyor 305 which causes the conveyor to run at the speed of the elevator and pick-up conveyors. The electric clutch 398 is simultaneously actuated which connects the continuously rotating sprocket 396 to the drive shaft 386 of the upper two-speed conveyor 304 which causes the conveyor to run at the lower speed of the dryer extension conveyors. Similarly, when the upper conveyor 340 of the article elevator arrangement 302 is elevated to a position in line with the upper two-speed conveyor 304 the electric clutch 394 is automatically actuated which causes the upper conveyor to run at the speed of the elevator conveyors. The electric clutch 414 is simultaneously actuated which causes the lower two-speed conveyor 305 to operate at the dryer conveyor speed.

The conveyor system 16 also includes a dump or waste conveyor 480 for conveying articles away from the dryer when operation of the apparatus is initially started and the manufactured articles are below standard. The dump or waste conveyor runs transversely of the apparatus and is approximately at the same elevation as the pick-up conveyor 252 when that conveyor is in the lower article conveying position. The elevator conveyor arrangement 302 functions to bridge the span between the pick-up conveyor 252 and the dump conveyor 480 when the dump conveyor is running. Operation of the dump conveyor deactuates the elevating device 343 so that one of the conveyors 342, 344 of the elevator arrangement 302 constantly remains in the bridging position. Otherwise, the conveyor system functions in the same manner as previously described.

For convenience, only one longitudinal line of the article conveyor system 16 has been described, it being understood the various shafts of the system run transversely of the apparatus to provide support structure for the remaining conveyor lines, one line serving each individual mold assembly.

The article producing apparatus 10 also includes a motivating system for operating the article manufacturing arrangement 14 and the article transfer mechanism 20. The motivating system comprises a common drive source such as an electric motor 500 secured as at 502 to the framework 38 of the apparatus. The motor drives a rotary pulley 504 connected by a V-belt 506 to a pulley 508 fixed to a transverse shaft 510 journaled to the framework 38 at 512. The shaft 510 has a second pulley 514 connected to a reduction unit 516 by a V-belt 518. The reduction unit drives a first gear wheel 520 journaled to the framework 38 by a transverse shaft 522 and the first gear wheel in turn meshes with a second gear wheel 524 also journaled to the framework by a transverse shaft 526. Each gear wheel is similarly dimensioned so that one revolution of the first wheel rotates the second wheel one complete turn. Each transverse shaft 522, 526 also carries another gear wheel at the opposite side of the apparatus and these wheels mesh in the same manner as the first and second gear wheels, 520, and 524, respectively.

Each of the first gear wheels 520 is connected to the reciprocating cross bar 152 of the article pressing assembly 120 by a rod 528 which extends from the gear wheel to an end of the cross bar. The rods 528 are pivotally connected to the gear wheels and the ends of the cross bar 152 so that one complete revolution of the gear wheels causes the pressing assemblies 152 mounted on the cross bar 150 to reciprocate between the above-described extended and fully retracted positions.

As described above, the second gear wheels 524 are connected to rotate the transverse shaft 526. This shaft carries the cam wheel 212 of the indexing mechanism 200 and as the cam wheel is caused to rotate, the indexing arm 208 connected to the wheel by the rod 218 functions to index the individual mold assemblies 58 to the article processing stations as described above. The transverse shaft 526 also carries the various cam plates (not shown) for the article transfer mechanism 20. Camming action necessary to produce the desired motion of the transfer mechanism is transmitted from these cams to the mechanism of the above-described linkages. Thus, one complete revolution of each of the gear wheels indexes each forming mold to the next article processing station, drives the article pressing arrangement through one complete cycle and operates the transfer mechanism through one complete cycle.

A control unit may be provided to actuate the electrically operated components of the article producing apparatus. The control unit can be a plurality of cam lobes which rotate one complete revolution for each rotation of the gear wheels. Suitable mercury switches attached to cam followers which cooperate with the cam lobes can be provided to automatically actuate or deactuate each of the electrical components.

The apparatus of the present invention operates continuously to produce fibrous pulp articles such as the articles identified by the reference numeral 12. Prior to starting the machinery each compartment 132 of the tank 104 is filled with a desired pulp slurry composition and the various individual mold assemblies 58 are secured to the rotatable mold supporting structure 30 so that each assembly includes one forming mold 22 on each of the six sides of the supporting structure. With an individual mold assembly positioned as illustrated in FIG. 3, the cycle of article production is about to commence.

First, the rotating cam wheel 212 causes the indexing mechanism 200 to move the forming molds to the various article processing stations 100. Starting with the first pulp depositing station, 102, metered suction is directed through the internal porting arrangement 60 to the forming mold at that station when the mold is completely immersed in the pulp slurry composition 106. An electrically operated valve may be provided to control the suction, the valve being automatically actuated and deactuated by one of the above-described cam lobe and mercury switch arrangements. Thus, an initial deposit of fibrous pulp material is drawn onto the wire screening 26 of the forming mold as the liquid phase of the slurry composition passes through the perforations 28 in the mold.

One full revolution of the circular cam wheel 212 having been completed, the next one-half revolution of the cam wheel causes the indexing mechanism 200 to move the forming mold from the first pulp depositing station 102 to the next or second pulp depositing station 108 where additional fibrous pulp material is deposited upon the wire screening of the forming mold. At the second station, continuous suction is applied to the forming mold through the internal porting arrangement which connects the mold to the continuous suction port 76 of each port box 72. The next one-half revolution of the cam wheel 212 enables the forming mold to remain at the second pulp depositing station so that fibrous pulp material continues to be deposited.

Continued rotation of the cam wheel 212 through the next half revolution causes the forming mold to move from the second pulp depositing station 108 to the flash removing station 110. As the cam wheel 212 rotates another half revolution, one of the cam actuated mercury switches of the above-described control unit actuates a control valve which in turn directs water to the spray head 112 at the flash removing station. A high velocity water stream 116 is thus directed onto the peripheral portions of the fibrous pulp material in the forming mold through the nozzles 114. This stream functions to beat down or otherwise remove fibrous pulp flashing which tends to accumulate adjacent the ring line 118 of the mold. Suction is continuously applied to the forming mold at the flash removing station 110 so that the water stream utilized to remove the pulp flashing is drawn through the mold and into the internal porting arrangement 60. This helps felt removed flash fiber to the body of the article and prevents dilution of the pulp slurry composition which might otherwise occur if the liquid stream simply spilled back into the bath.

The next half revolution of the cam wheel 212 moves the forming mold from the flash removing station 110 to the article pressing station 120. With the forming mold located at the pressing station the cross bar 152 carrying the various pressing assemblies 150 is positioned halfway through its downstroke. During the latter one-half revolution of the cam wheel 212, the cross bar moves to the fully extended or pressing position and then back to a position in which the various pressing assemblies 150 are located outside the forming molds. Suction is continuously applied to the forming mold at the article pressing station through the internal porting arrangement so that liquid expressed from the fibrous pulp during the pressing operation is drawn through the mold and into the porting arrangement. The continuous suction also functions to maintain the fibrous pulp material in engagement with the forming mold. At this station the pressing head 122 of each assembly is supplied with air through the line 182 and the hollow shaft 178. The air functions to assist the suction, applied to the forming molds, in removing water from the article and its flow may be controlled by the above-described control unit in the same manner as the water flow is controlled at the flash removing station.

The indexing mechanism 200 next moves the forming mold from the article pressing station to the article stripping station 124 where the fibrous pulp article is removed from its associated mold by the transfer mechanism 20. At the article transfer station the internal porting arrangement 60 connects the forming mold to the air stream port 84 of each port box 72 to assist the article take-off head 258 of the transfer mechanism 20 in removing the article.

From the article stripping station 124 the indexing mechanism rotates the forming mold to the mold cleaning station where an oscillating or reciprocating spray head 128 directs a water stream across the wire screening 26 of the forming mold. The spray head is automatically actuated when the various forming molds arrive at the cleaning station and this head operates to loosen and remove fibrous pulp material which adheres to the wire screening during the stripping operation. As previously explained, the oscillating head efficiently cleans the mold and enables less water to be utilized in the cleaning operation than might otherwise be required if the head was of the stationary type. The spent water simply spills into the trough 131 and out through the drain pipe 133.

The article transfer mechanism 20 operates to transport articles from the stripping station 124 to an article receiving station 250 which may comprise a pick-up conveyor 252. As described above, the articles may be inverted during the transfer operation by the article inverter arrangement 282 of the transfer mechanism. Assuming the articles are transferred without inversion, the article take-off head 258 first moves in a downward direction into the forming mold at the article stripping station as illustrated in FIG. 13. The actuating arms 272 connected by the linkages 278 to the cam plates (not shown) on the transverse shaft 526 cause the head to so move as the cam plates rotate. When the transfer mechanism is positioned as illustrated in FIG. 13, suction is applied to the take-off head, which suction may be automatically controlled by a cam lobe and mercury switch arrangement in the above-mentioned control unit. Continued rotation of the transverse shaft 526 then causes the actuating arms 272 to raise the cross bar 259 which in turn causes the take-off head and removed article to move to the position illustrated in FIG. 14. The pendulums 254 of the transfer mechanism then swing to the position illustrated in FIG. 15 under the influence of the reciprocating linkages 280 connected to a second set of cam plates (not shown) on the transverse shaft 526. At the position shown in FIG. 15, the pick-up conveyor 252 is located directly below and in close proximity to the article on the take-off head. An air blast actuated by the above-controlled unit is then directed to the perforated take-off head to eject the article onto the conveyor. When the article is finally positioned on the conveyor, the control unit deactuates the hydraulically operated elevating device 310 and the conveyor drops to its lower article conveying position illustrated in phantom in FIG. 15. The reciprocating linkages 280 then swing the pendulums 254 to a position normal to the next forming mold at the stripping station, this position being similar to that illustrated in FIG. 14.

During the transfer operation each of the moving elements of the transfer mechanism is caused to move regardless of whether the article is inverted or non-inverted. When the article is transferred without being inverted the cam follower 284 which cooperates with the rotatable bar cam 286 is simply removed from its supporting structure so that the rotatable bar cam does not cause the take-off head to rotate during the transfer operation. However, when article inversion is desired, the cam follower 284 is fastened to its supporting structure which then enables the bar cam to rotate the article take-off head when the head is in the retracted position.

During article transfer with inversion, the article take-off head enters the forming mold at the stripping station in the same manner as illustrated in FIG. 13. The article is then drawn onto the take-off head by suction after which the rods 260 are drawn in an upward direction to remove the head from the mold. When the pendulum commences to swing to the position illustrated in FIG. 17, the bar cam is caused to rotate by the linkage 288 which in turn rotates the take-off head to the position illustrated in FIG. 17. As explained above, due to the geometry of the stub shafts 264, 270, the take-off head can only rotate when the stub shafts are aligned and this occurs when the head is fully retracted. Continued swinging motion of the pendulums 254 causes the take-off head to enter the article receiving surface 290 of the inverter arrangement 282. Air which is normally applied to eject the fibrous pulp article onto the pick-up conveyor then functions to eject the article onto the receiving surface 290. Suction controlled by the above-described control unit may be applied to the article receiving surface to assist in article transfer from the take-off head to the receiving surface. The pendulums 254 then swing back to a position normal to the next mold at the article stripping station. During the return swing the reciprocating linkage 296 draws the rack 294 in an upward direction which rotates the article receiving surface to the position illustrated in FIG. 18. The control unit then terminates the suction applied to the article receiving surface and directs an air blast to that surface to eject the article onto the pick-up conveyor 252.

The pick-up conveyor 252 and the remaining conveyors of the article conveyor system 16 operate automatically to convey fibrous pulp articles 12 to several levels of the article dryer 18. The electric motor 450 is continuously operating so that automatic actuation of the various clutch mechanisms and the elevating devices functions to drive the belts in a predetermined manner. As described above, the fibrous pulp article is ejected onto the pick-up conveyor 252 when that conveyor is in its upper article receiving position. Immediately thereafter a suitable control in the control unit deactuates the elevating device 310 which causes the pick-up conveyor 252 to drop to its lower article conveying position. At the article conveying position the electric clutch 338 for the pick-up conveyor and the electric clutch 380 for the article elevator conveyor arrangement are simultaneously actuated by suitable controls in the control unit. When the upper and lower conveyors of the article elevator arrangement are positioned as illustrated in FIG. 19, the electric clutch 394 of the upper two-speed article conveyor 304 is also actuated by an automatic control in the control unit. Actuation of these three electric clutches causes the pick-up conveyor 252, the upper and lower conveyors of the elevator arrangement 302 and the upper two-speed article conveyor 304 to run at the same speed. Thus, an article positioned upon the pick-up conveyor is transported to the lower conveyor 342 of the article elevator arrangement 302 while the fibrous pulp article 12 on the upper conveyor 340 of the elevator arrangement is simultaneously transported to the upper two-speed article conveyor 304. After the articles are delivered from one conveyor to an adjacent conveyor, the above three electric clutches are deactuated and the belts of the various conveyors remain stationary until subsequent actuation of the clutches.

Next, the control unit causes the elevating device 310 to raise the pick-up conveyor 252 so that it may receive another article from the transfer mechanism. With the conveyors as illustrated in FIG. 19, the elevating device 343 for the article elevator arrangement 302 is simultaneously deactuated when the elevating device 310 is actuated to raise the pick-up conveyor. Lowering of the article elevator arrangement causes the lower conveyor 342 to align with the lower two-speed conveyor 305 as shown in FIG. 18. When the pick-up conveyor is then lowered to its article conveying position, the electric clutch 338 for the pick-up conveyor and the electric clutch 380 for the article elevator arrangement are simultaneously actuated. At this moment the electric clutch 410 for the lower two-speed article conveyor 305 is also actuated. Thus, the article on the pick-up conveyor is delivered to the upper conveyor 340 of the article elevator arrangement 302 while the article previously positioned on the lower conveyor 342 is conveyed to the lower two-speed conveyor 305.

As described above, the two-speed article conveyors are arranged to run at both high and low speeds. Articles are delivered to the two-speed conveyors at a high speed and taken off these conveyors at the somewhat slower speed of the article dryer extension conveyors 306, 307. In order to drive, for example, the lower two-speed article conveyor 304 at the slower dryer extension conveyor speed, the electric clutch 410 is deactuated while the electric clutch 414 is actuated. This connects the transverse drive shaft 404 to the drive shaft 424 of the dryer extension conveyor 307 through the miter gear box and roller chain arrangement. Thus, the article on the lower two-speed conveyor is smoothly transported to the lower article dryer extension conveyor 307. As can readily be understood, the two-speed article conveyor to which an article is delivered runs at the high speed while the two-speed conveyor upon which an article has already been delivered operates at the lower speed. Accordingly, when the upper two-speed article conveyor is running at the high speed, the lower conveyor is running at the low speed and vice versa.

This particular conveyor system operates to supply newly formed articles to the vertically spaced apart dryer conveyors 300, 301 of the article dryer 18. Since two dryer conveyors are employed, each conveyor handles only one half of the articles produced by the machine. The dryer conveyor speed can then be one half of the machine's production rate. The length of the dryer is also minimized by this arrangement and is about one half as long as a dryer suitable for this production rate having a single conveyor. Finally, the articles may be conveniently removed from the dryer conveyors by stacking equipment which operates at one half the machine's production rate.

While the above described embodiments constitute a preferred mode of practicing this invention, other embodiments and equivalents may be resorted to within the scope of the actual invention, which is claimed as:

1. Apparatus for producing fibrous pulp articles comprising means for manufacturing the articles, means for conveying the articles to an article dryer, and means for transferring the articles from the manufacturing means to the conveying means, the article manufacturing means including a plurality of forming molds connected to a framework for rotation past spaced article processing stations positioned adjacent the path of mold travel, and indexing means connected to the framework for intermittently rotating the forming molds to the article processing stations, the article processing stations including a pulp depositing station for depositing fibrous pulp material upon the forming molds, a deflashing station for removing fibrous pulp flash from the forming molds, a pressing station for pressing the fibrous pulp material within the forming molds, and a cleaning station for removing wasted pulp from the forming molds after the fibrous pulp articles are transferred therefrom, the article conveying means comprising article pick-up conveyor means connected to the framework for shifting vertically between an article receiving position and an article conveying position, article elevator conveyor means connected to the framework for receiving articles from the pick-up conveyor means and delivering them to positions in line with vertically spaced apart conveyors of an article dryer, two-speed article conveyor means connected to the framework for transferring articles from the article elevator conveyor means to vertically spaced apart conveyors of an article dryer, and motivating means connected to the framework for operating the article conveyor means.

2. Apparatus for producing fibrous pulp articles as in claim 1 wherein the motivating means includes means for driving the dryer conveyors at a speed substantially less than the speed of the elevator conveyor means, the motivating means driving the two-speed conveyor intermittently at the speed of the dryer conveyors and the speed of the elevator conveyor means so as to effect a smooth transfer of the articles onto the dryer conveyors.

3. Apparatus for producing fibrous pulp articles as in claim 1 wherein the article dryer has two vertically spaced apart conveyors and the elevator conveyor means has two article conveyors, the article conveyors of the elevator conveyor means being vertically spaced apart approximately one-half the distance as between the dryer conveyors.

4. Apparatus for producing fibrous pulp articles as in claim 1 including a waste conveyor connected to means for running the waste conveyor transversely to the article pick-up conveyor means, the waste conveyor being horizontally spaced from the article pick-up conveyor means by the article elevator conveyor means, the article elevator conveyor means being connected to means for holding the article elevator conveyor means in the bridging position between the waste conveyor and article pick-up conveyor means when the waste conveyor is operating so that articles on the pick-up conveyor means are transported to the waste conveyor means by the article elevator conveyor means.

5. Apparatus for producing fibrous pulp articles comprising means for manufacturing the articles, means for conveying the articles to an article dryer, and means for transferring the articles from the manufacturing means to the conveying means, the article manufacturing means including a plurality of forming molds connected to a common shaft for rotation past spaced article processing stations positioned adjacent the path of mold travel, and indexing means connected to a framework for intermittently rotating the forming molds to the article processing stations, the article processing stations including a pulp depositing station for depositing fibrous pulp material upon the forming molds, a deflashing station for removing fibrous pulp flash from the forming molds, a pressing station for pressing the fibrous pulp material within the forming molds, and a cleaning station for removing wasted pulp from the forming molds after the fibrous pulp articles are transferred therefrom, the plurality of forming molds comprising individual mold assemblies with each mold assembly including several of the plurality of forming molds, and a pulp slurry bath in the path of travel of the mold assemblies having adjustable partition structure therein arranged along planes perpendicular to the axis of rotation of the common shaft for dividing the bath into compartments so that the mold assemblies travel through the compartments of the bath.

6. Apparatus for producing fibrous pulp articles comprising means for manufacturing the articles, means for conveying the articles to an article dryer, and means for transferring the articles from the manufacturing means to the conveying means, the article manufacturing means including a plurality of forming molds connected to a framework for rotation past spaced article processing stations positioned adjacent the path of mold travel, and indexing means connected to the framework for intermittently rotating the forming molds to the article processing stations, the article processing stations including a pulp depositing station for depositing fibrous pulp material upon the forming molds, a deflashing station for removing fibrous pulp flash from the forming molds, a pressing station for pressing the fibrous pulp material within the forming molds, and a cleaning station for removing wasted pulp from the forming molds after the fibrous pulp articles are transferred therefrom, the article transfer means compising a transfer arm connected to means for shifting the arm between a position normal to a forming mold and a position directly above an article receiving station, article take-off means on the transfer arm connected to means for shifting the article take-off means longitudinally relative to the arm between an extended position in which the article take-off means rests within the forming mold and a retracted position in which the article take-off means clears the forming mold, suction means connected to the article take-off means for drawing a fibrous pulp article onto the article take-off means when the transfer arm is normal to the forming mold and the article take-off means is extended, article release means connected to the article take-off means for releasing the fibrous pulp article from the article take-off means, article inverter means connected to means for swinging the inverter means between a position adjacent the article take-off means and an article receiving station for inverting the fibrous pulp article during the transfer operation, and motivating structure for shifting the arms, extending and retracting the article take-off means, and swinging the article inverter means.

7. Apparatus for producing fibrous pulp articles as in claim 6 wherein the article take-off means is connected to means for rotating the article take-off means upon the transfer arm between a take-off position in line with the forming mold and an article release position in line with the article inverter means, the article inverter means including an article receiving surface connected to means for rotating the article receiving surface between a position in line with the article take-off means and a position directly above an article receiving station.

References Cited
UNITED STATES PATENTS

| | | | |
|---|---|---|---|
| 2,183,869 | 12/1939 | Randall et al. | 162—392X |
| 2,760,412 | 8/1956 | Lemieux | 162—392X |
| 2,772,608 | 12/1956 | Emery | 162—392 |
| 3,166,468 | 1/1965 | Daniele et al. | 162—392 |
| 3,275,498 | 9/1966 | Roth et al. | 162—392X |
| 1,615,237 | 1/1927 | Schwartz | 34—207UX |
| 2,859,669 | 11/1958 | Leitzel | 162—392 |
| 2,990,314 | 6/1961 | Leitzel | 162—220 |
| 2,995,187 | 8/1961 | Wells | 162—390 |
| 3,135,649 | 6/1964 | Foote | 162—392X |
| 3,398,049 | 8/1968 | Randall | 162—391X |

HOWARD R. CAINE, Primary Examiner

A. L. CORBIN, Assistant Examiner

U.S. Cl. X.R.

34—207, 236; 162—390, 391, 392